P. G. ZIMMERMANN.
DRIVING MECHANISM FOR AIRSHIPS.
APPLICATION FILED SEPT. 13, 1910.

1,089,029.

Patented Mar. 3, 1914.

2 SHEETS—SHEET 1.

Witnesses:
E. Greenberger
E. W. Stork

Inventor
Paul G. Zimmermann
By his Attorney

P. G. ZIMMERMANN.
DRIVING MECHANISM FOR AIRSHIPS.
APPLICATION FILED SEPT. 13, 1910.
1,089,029.
Patented Mar. 3, 1914.
2 SHEETS—SHEET 2.
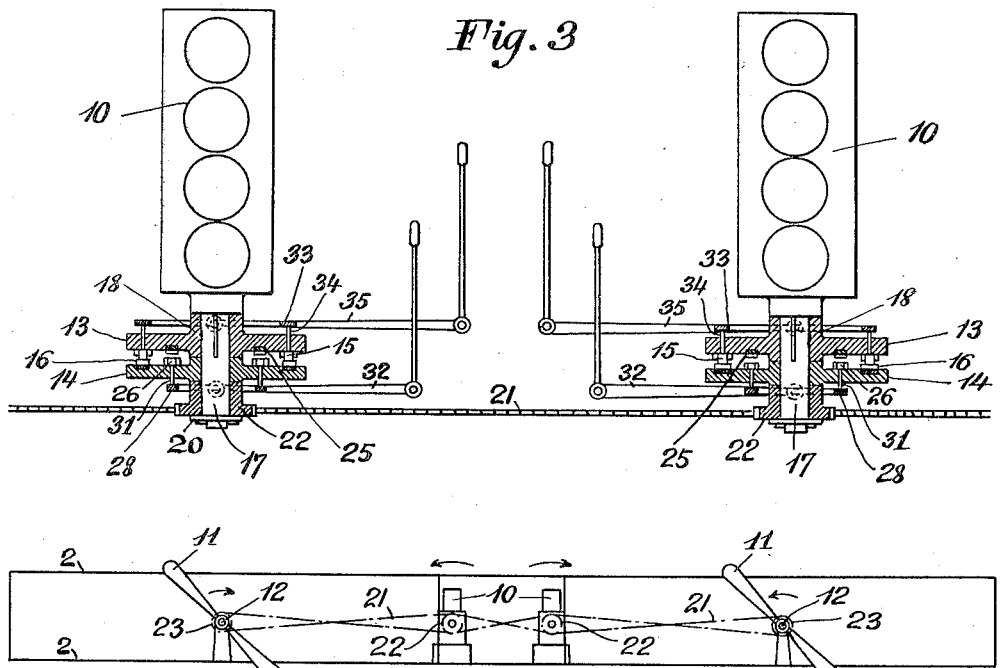
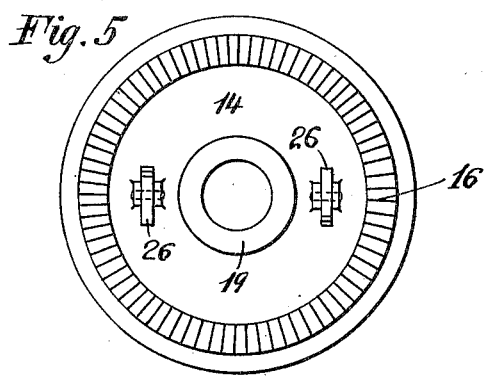
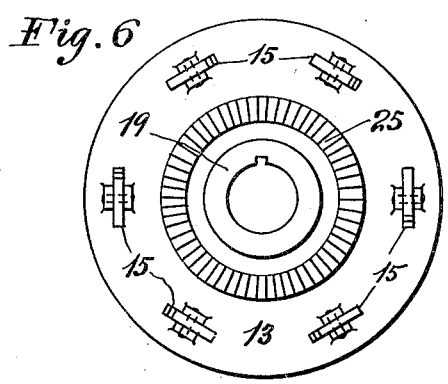
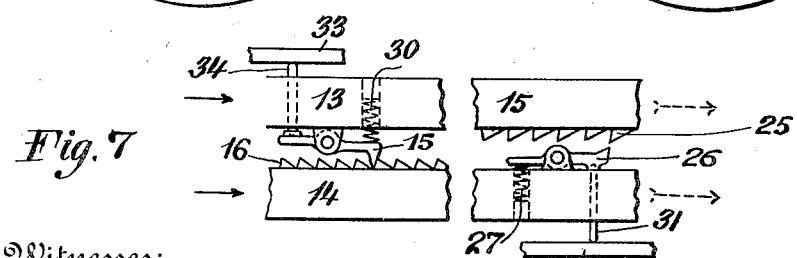
Witnesses:
E. Greenberger
E. W. Stork
Inventor
Paul G. Zimmermann
By his Attorney

UNITED STATES PATENT OFFICE.

PAUL G. ZIMMERMANN, OF SAN JUAN, PORTO RICO.

DRIVING MECHANISM FOR AIRSHIPS.

1,089,029.  Specification of Letters Patent.  Patented Mar. 3, 1914.

Application filed September 13, 1910. Serial No. 581,813. REISSUED

*To all whom it may concern:*

Be it known that I, PAUL G. ZIMMERMANN, a citizen of the United States, residing at San Juan, Porto Rico, have invented new and useful Improvements in Driving Mechanism for Airships, of which the following is a specification.

This invention relates to air-ships, and more particularly to the driving mechanism thereof.

The invention appertains especially to safety driving mechanism for aeroplanes, or heavier-than-air machines employing supporting planes.

An aeroplane driven by a single motor is necessarily subject to total disability of its driving mechanism in event of a breakdown of the motor, in which event the aviator's sole chance of effecting a safe alighting is his skill and ability in controlling the machine so as to accomplish a gliding descent.

The object of my invention is to obviate the danger of total disability of the driving mechanism of the aeroplane by providing two or more distinct motors and combining them with the propelling means in such manner that they jointly drive the same propelling means and the stoppage of either motor automatically disconnects this motor from the propelling means while the remaining motor or motors remain connected therewith, the motor so disconnected being automatically connected again to the propelling means when the motor is started or speeds up. It is of the greatest importance that any of the motors on stopping shall be automatically and immediately disconnected from the propelling means, otherwise this dead motor would be driven by the other motor or motors through the propelling means, and since the compression employed in aeroplane motors is usually high the dead motor would act as a powerful brake tending to stop the remaining motors. Furthermore, the automatic disconnecting and reconnecting of the motors is of great value since it relieves the aviator of the necessity of throwing manually operated clutches or the like.

With these ends in view the invention consists in the parts, improvements and combinations hereinafter described with reference to certain specific illustrative embodiments and more particularly pointed out in the appended claims.

Figure 1:
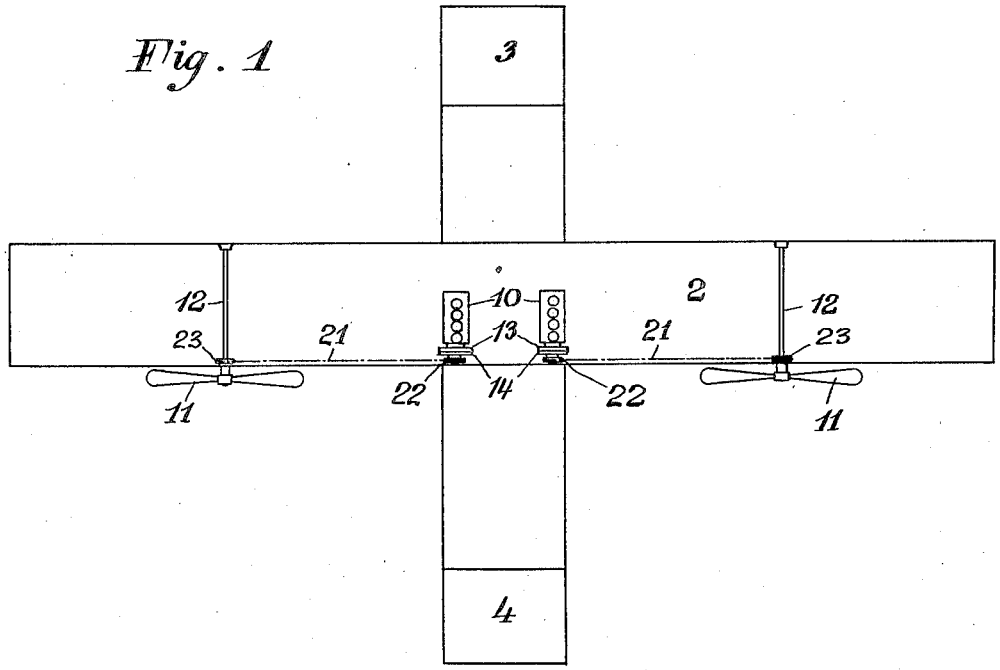
Figure 2:
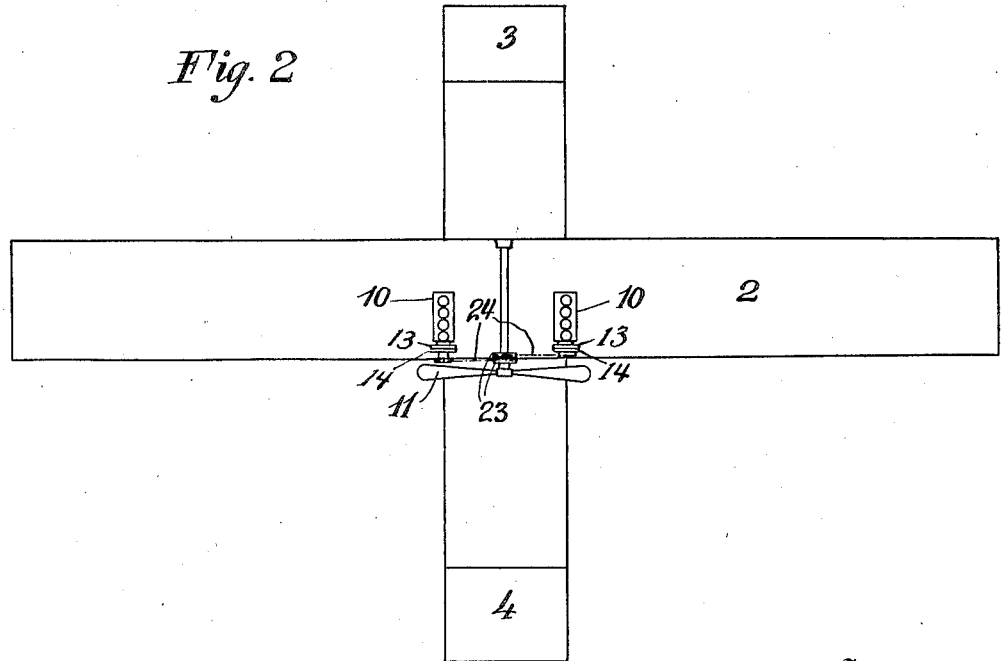

In the drawings showing these illustrative embodiments: Figure 1 is a plan view indicating the preferred arrangement of two propellers and two motors in an aeroplane in accordance with my invention, the upper supporting plane being omitted; Fig. 2 is a similar view showing two motors and one propeller; Fig. 3 is a plan view of the motors of Fig. 1 and the driving connections; Fig. 4 is a rear view corresponding to Fig. 1; Figs. 5 and 6 are face views of the driving and driven members or disks; and Fig. 7 is a side view, broken away, of the driving and driven members, showing the arrangement of the driving and cranking dogs and ratchets in the preferred construction.

Inasmuch as this invention relates to the driving mechanism of aeroplanes and is not concerned with the various problems of support and guiding, no attempt is made in the accompanying drawings to illustrate in detail the structural features of an operative aeroplane, such as the supporting of the planes, the bracing and the like. It will be obvious that the supporting, guiding, elevating and stabilizing planes and various features of bracing and supporting may be constructed in accordance with any accepted or preferred practice.

The aeroplane indicated in the accompanying drawings is of the biplane type, but the invention may be embodied in aeroplanes or heavier-than-air machines of any type.

The reference numerals 2, 2, indicate supporting planes, 3 a forward elevating plane, and 4 a rear plane.

In accordance with this invention the propelling means may consist of one propeller, as shown in Fig. 2, or of two propellers, as shown in Figs. 1 and 4, or of a greater number of propellers, in any of which cases all of the propellers are driven by the plurality of motors jointly.

Reference will first be had more particularly to Figs. 1 and 3 to 7, though much of the description will be applicable as well to the form of the invention shown in Fig. 2. In the said views the reference characters 10, 10, indicate two internal combustion motors of any suitable type supported in general conformity with accepted or preferred practice. They are preferably located adjacent the longitudinal center of the machine. As shown, they are disposed at opposite sides of this longitudinal center, between the supporting planes and adjacent the rear edges thereof, but the motors may be otherwise located if desired. The two propellers 11, 11, are of any suitable form for aerial propulsion and may be variously located, but are preferably disposed, as shown, at some distance at opposite sides of the pair of motors and in rear and adjacent the rear edges of the supporting planes. The shafts 12, 12, of these propellers may be supported and journaled in any suitable manner from the supporting structure of the planes. In accordance with the invention driving connections are provided between the motors and the propellers so that the propellers are driven jointly by the motors, and means are provided for automatically disconnecting and reconnecting the motors individually. The said means may be widely varied. In the particular construction illustrated, automatically uncoupling and recoupling one-way driving connections are provided for the several motors. In the construction illustrated each of these connections comprises a driving member or disk 13 and a driven member or disk 14. The driving member 13 is shown as provided on one face with a suitable number of dogs 15, and the opposed face of the driven member is shown as provided with a coöperating ratchet 16. The dogs are held constantly in engagement with the ratchet by suitable means, such as springs 30. Each driving member 13 is connected to the corresponding motor, and the driven members 14 are connected to the propellers. In the best construction of this form of the invention, the driving and driven members 13 and 14 are mounted on the crank shafts 17 of the motors, the driving member being fixed on the shaft and the driven member being loose thereon. Thrust bearings 18 are provided between the driving members and the engine frames or any other suitable support, and other thrust bearings 19 are formed between the driving and driven members. The driving members may be held on the shafts by any suitable collars or the like 20. While the driven members might be connected directly to the propellers, in accordance with this particular construction illustrated, a driving element is interposed between the driven members 14 and the propellers, and in accordance with this preferred form of the invention this driving element is common to both propellers, so that breakage of this element will cause both the propellers to stop and not one only. Where two propellers are employed and there is a possibility of one stopping and the other continuing to revolve a serious accident may occur. This driving element is illustrated as a sprocket chain 21, which passes over sprocket wheels 22 formed on or rigid with the driven members 14 and sprocket wheels 23 fixed on the propeller shafts. Thus, this chain constitutes a connection between the propellers so that they must revolve together if at all, a connection between the driven members and the propellers, and a connection between the driven members. It will be obvious that a belt drive may be substituted for the chain drive. This chain may be crossed in the manner shown, so as to secure proper purchase upon the sprockets and to cause the propellers to revolve in opposite directions. In order to prevent difficulty from the interference of the crossing strands of the chain, the said strands or courses may travel in individual tubes, not shown, in accordance with the accepted practice for crossed sprocket chains in air-ship drives. I may and preferably do provide means for manually disengaging the dogs 15 from the ratchets 16. The particular embodiment of such means illustrated upon the drawings consists of a floating ring 33, for each set of dogs 15, which ring is actuated by a hand lever 35 or the like and pushes a set of pins 34 received in apertures in the disk 13 so as to cause these pins to contact with the dogs and move them out of engagement with the ratchet.

In the form of the invention shown in Fig. 2, the propelling means consists of a single propeller 11 located with its axis in the vertical plane of the longitudinal center line of the machine. The construction is substantially similar to that already described, except that the driven members 14 are shown as connected with the propeller shaft by separate sprocket chains 24, 24.

A feature of the invention which I prefer to employ in both forms of construction illustrated consists in manual means for coupling the driven members 14 with their driving members 13, so as to enable the motors to be cranked by turning the driven members by manual operation of the propeller and also to enable one motor to be cranked by the other. The said means may be widely varied. Any suitable kind of clutch connection may be employed. In the particular construction illustrated the driving member 13 is provided with a ratchet 25, the faces of which are reversed to those of the ratchet 16, and the driven member is provided with a suitable number of dogs 26. These dogs are normally held out of engagement with the ratchet by suitable means, such as springs 27, and are adapted to be projected into engagement with the ratchet by manual means, a suitable embodiment of which is shown upon the drawings. In this illustrated construction a floating ring 28 encircles an extension of the driven member and is adapted to bear against the rear ends of pins or plungers 31 working in apertures in the driven member and adapted to contact at their forward ends with the dogs. Suitable levers 32 or other devices are provided for pressing the rings against the pins and causing the latter to force the dogs 26 into engagement with the cranking ratchets.

In operation, the propeller or propellers are driven by the motors jointly through the pawl and ratchet drive connections, or any other suitable one-way, automatically disengaging and reëngaging driving connections. In event of one of the motors stopping, the corresponding driven member is free to rotate independently of its driving member, since the ratchet 16 merely clicks over the dogs. This clicking may be stopped by throwing the corresponding lever 35 so as to disengage the dogs 15 from the ratchet. Relative rotation between the driven and driving member will also occur for very brief intervals in case the other motor speeds up or the speed of the first motor drops off. In such event, the driving member again drives its driven member as soon as the corresponding motor has caught up. The driving members automatically connect with their driven members to drive the latter, whenever the motors are started. To crank, one set of dogs 26 may be engaged with their ratchet 25 by operating the corresponding lever 32, after which the corresponding motor may be turned over by manually rotating the propeller. Now by engaging the other set of dogs 26 with their ratchet by throwing the other lever 32, the other engine may be cranked by the first. One engine may be cranked by the other at any time. Either or both engines may be disconnected manually from the propellers by means of the levers 35. It will, of course, be obvious that the driving ratchet might be located on the driving member and the driving dogs on the driven member, and that a similar reversal of the cranking dogs and ratchet might be effected. The two ratchets, as well as the dogs, are preferably of hardened steel, and may be formed of separate pieces from their disks 13 and 14, being let into or secured to these disks in any suitable manner. The driving members 13 may and preferably do constitute fly-wheels.

While I have shown two specific illustrative embodiments of my invention, it will be understood that many other embodiments are possible, and that numerous changes in details, arrangements, form, sizes and proportions may be made without departing from the invention.

It will be obvious that spur gear, bevel gear, or any other suitable or well-known drive may be utilized in connection with the invention.

Having thus described my invention, what I claim is:

1. Driving mechanism for air-ships, comprising the combination of a plurality of motors, a plurality of driven members, one-way connections between each motor and the corresponding driven member whereby each driven member may be driven by its motor but may rotate independently thereof on stopping of the said motor, a plurality of propellers, and a common endless flexible driving connection between the driven members and the propellers whereby all the propellers must stop on breaking of this element.

2. Driving mechanism for air-ships, comprising a plurality of motors, propelling means connected with the motors so as to be driven thereby jointly, one-way connections between the motors and the propelling means whereby the latter may be driven by one of the motors in event of stopping of the remainder, and manually-operated means for connecting the propelling means with the motors so that the motors may be cranked by turning the propellers.

3. Driving mechanism for air-ships, comprising the combination of a plurality of motors, a driving and a driven member pertaining to each motor and automatic one-way driving connections between said members, propelling means, means connecting said propelling means with the driven members and connecting the driven members with each other, and manually-operated means for connecting either driven member with its driving member so that the corresponding motor may be cranked by the other.

4. In an aeroplane propeller drive, the combination, with the propellers, of two engines, and a single endless driving connection between said propellers and engines and arranged to be driven by either one or both of the engines simultaneously.

5. In an aeroplane propeller drive, the combination, with the propellers, of two engines, a single endless driving connection between the engines and propellers, and means for starting one engine from the motion of the other.

6. In an aeroplane propeller drive the combination, with two propellers, of two engines having oppositely running driving shafts, sprocket wheels on said shafts, and a single endless power transmission chain coöperating with said propellers and said shafts.

7. In an aeroplane propeller drive, the combination, with the propellers and with two engines including their driven shafts, of driving connections between said shafts and the propellers comprising two sprocket wheels operatively connected with the propellers respectively, and two separate sprocket wheels loosely mounted upon each engine shaft and having clutch connection therewith in one direction of such wheels, and a single sprocket chain coöperating with all of said sprocket wheels.

8. In an aeroplane propeller drive, the combination, with the propellers, of two engines, driving connections between the engines and propellers, which connections are always in condition to be driven by either one or both of the engines, and means for starting the engine from the motion of the other.

In testimony whereof I have hereunto set my hand in presence of two subscribing witnesses.

PAUL G. ZIMMERMANN.

Witnesses:
   Mowry A. Arnold,
   Alan M. Weaver.